United States Patent Office 3,681,085
Patented Aug. 1, 1972

3,681,085
FOOD PRODUCT CONTAINING TEMPEH
Paul Gyorgy, 201 Curwen Road, Rosemont, Pa. 19010
No Drawing. Filed Apr. 27, 1970, Ser. No. 32,424
Int. Cl. A23b 1/00
U.S. Cl. 99—107     16 Claims

ABSTRACT OF THE DISCLOSURE

An edible food product is prepared by forming a uniform admixture of fish pieces or fatty meat pieces and tempeh and sterilizing the resulting admixture.

---

Tempeh, a fermented soybean preparation, has been an important food product for centuries in the Far East, particularly in Indonesia. Tempeh is an important and valuable foodstuff because it contains proteins, carbohydrates, fats, vitamins and other nutrients. Compared with unfermented soybeans the riboflavin content is significantly higher in tempeh. It has been shown that during fermentation a glycoside of soybean is split with the liberation of an antioxidant which was identified as 6,7,4'-trihydroxyisoflavone, see P. Gyorgy, K. Murata and H. Ikehata, Nature (London) 203, 870 (1964). Tempeh also contains an antibacterial compound especially active against gram-positive microorganisms, including typical gut bacteria.

Tempeh is prepared by soaking whole soybeans in water and dehulling the beans. The dehulled soybeans are then boiled to soften the beans and the cooked soybeans are then spread out in thin layers (1–2 inches deep) and permitted to air dry. The soybeans are then inoculated with molded soybean materials or tempeh from a previous tempeh fermentation and the inoculated soybeans are permitted to ferment until the soybeans are substantially completely molded. The resulting soybean product is known as tempeh. Other special techniques for the production of tempeh are known, see U.S. Pats. 3,228,773 (1966) and 3,243,301 (1966). The disclosures of these patents are herein incorporated and made part of this disclosure.

Fish is an important food and at certain locations it is abundantly available. Unfortunately, fish is unstable and, unless specially treated, stored and handled, easily spoils and develops an objectionable fish odor and taste. Because of the potentially vast amounts of fish obtainable as a food source, the development of a stable food product containing fish and free of objectionable odor or taste would be an important contribution to the world food resources.

There is available a fish food product known as fish protein concentrate (FPC). This food product however is chiefly protein and is substantially fat free since in the preparation of FPC the fat is extracted. This deprives the fish of its most caloriferous constituent. Furthermore, FPC is relatively expensive since the fat extraction operation is costly.

It is an object of this invention to provide a stable tempeh-containing food product, such as a stable, sterilized tempeh and fish-containing or fatty meat-containing food product.

It is an object of this invention to provide an improved food product containing fish.

It is another object of this invention to provide a stable fish-containing food product having a pleasant odor and taste.

It is another object of this invention to provide a stable fish-containing food product rich in important nutrients, such as proteins, carbohydrates, fats and vitamins.

Still another object of this invention is to provide an edible product made up of fish and tempeh.

How these and other objects of this invention are achieved will become apparent in the light of the accompanying disclosure. In at least one embodiment of the practice of this invention at least one of the foregoing objects will be achieved.

An improved food product containing fish or fatty meat is obtained by preparing an admixture made up of fish, such as fish pieces, or fatty meat, such as pork, and tempeh and sterilizing the resulting admixture. Preferably, the resulting sterilized admixture is then dried or lyophilized.

In accordance with one practice of this invention, an edible fish product is obtained by preparing a fermentable admixture made of fish, preferably sterilized or cooked, and tempeh and a suitable acid, such as lactic acid, to adjust the admixture to an acid pH in the range 4–6, preferably about 5, for fermentation, fermenting or incubating the resulting admixture and sterilizing the resulting fermented admixture, preferably also drying or lyophilizing the resulting fermented admixture to a moisture content of about 2% by weight.

More particularly, in accordance with one embodiment of the practice of this invention, fresh, raw fish, preferably fatty fish, is eviscerated and cleaned, cut up and macerated. The resulting macerated fish is then autoclaved, such as at a temperature of about 115° C. for 10 minutes at a steam pressure of about 15 p.s.i., to produce a sterile fish product. Lyophilized tempeh, such as lyophilized Indonesia tempeh, is sieved and ground to a fine fluffy powder. The sterile fish product and the tempeh powder in suitable amounts, such as substantially equal amounts by weight, e.g. about 9 parts by weight sterile fish and 8 parts by weight tempeh powder, are mixed with lactic acid, e.g. 2% v./v. sterile lactic acid. The lactic acid is added in an amount to give a final moisture content of the resulting fermentation admixture of about 65% w./v. The resulting fermentation admixture is then spread on wire screen trays and placed in a constant temperature incubator for about 12–36 hours, e.g. about 30 hours, at 37° C. The resulting fermented product is then removed, dried, such as by freeze-drying, and packed and stored at a low temperature, such as below about −10° C. for shipment.

Any edible fish, including shellfish, can be employed in the practice of this invention for the preparation of a stable fish tempeh admixture in accordance with the practices of this invention. The practice of this invention, as indicated, is also applicable to food products made from a fatty meat, such as pork, and tempeh. Further, in accordance with another embodiment of this invention, if promptly processed, fresh fatty meat or raw fish after having been cleaned and eviscerated may be cut into pieces and/or ground and directly admixed with tempeh and fermented. The resulting fermented admixture may then be sterilized and further handled and treated, including packaging in hermetically sealed containers or cans in accordance with this invention.

Also in accordance with another embodiment of this invention fresh fish, after cleaning or eviscerating if necessary, may be ground or macerated and uniformly intimately admixed with tempeh, such as tempeh powder and the resulting admixture sterilized and suitably packaged, as in hermetically sealed containers, for storage, shipment and eventual consumption.

The following example is illustrative of the practices of this invention. Fresh raw mackerel was cleaned, eviscerated and sliced into small pieces and these pieces macerated. The resulting macerated fish was then divided into portions of about 900 grams and each portion was placed in large Pyrex trays, covered and autoclaved at 115° C. for about 10 minutes at a steam pressure of about 15 p.s.i. to sterilize the macerated fish.

Lyophilized Indonesian tempeh was passed through a 2 mm. sieve and then a 0.5 mm. sieve to produce a fine fluffy tempeh powder. 800 grams of this tempeh powder were then mixed with 900 grams of the sterilized, macerated or ground fish and admixed with 470 ml. of 2% v./v. sterile lactic acid. The amount of lactic acid employed was calculated to give a fermentation mixture having a moisture content of about 65% w./v. The resulting fermentation mixture was then placed on wire screen trays and spread to approximately 1" thick. The trays were placed in a constant temperature incubator and incubated for 30 hours at 37° C. At the end of 30 hours the incubated or fermented product was removed and transferred to a bulk freeze dryer and lyophilized. The resulting fermented fish-tempeh mixture was then ground, packaged in polyethylene bags and stored at about —20° C. for shipment. It is desirable that the resutling fermented product be sterilized immediately after the fermentation operation before final packaging. In this case the sterilized fermented product may be stored at room temperature.

In a similar procedure 900 grams of the fish powder and 800 grams of sterile ground soybeans were admixed with 470 ml. of 2% v./v. sterile lactic acid. The resulting sterile fish-soybean-lactic acid mixture was also spread on wire screen trays and incubated for 30 hours at 37° C. and at the end of this period the resulting fermented material was ground and packaged in polyethylene bags and stored at a temperature of about —20° C. for shipment. This material was prepared for control and evaluation purposes.

Fermented tempeh-fish products and soybean-fish products prepared in accordance with the above procedures were tested for protein efficiency ratio (PER). The results of these tests together with the results obtained from another control, Carnation Milk, are set forth in accompanying Table I:

TABLE I.—PER OF FISH/SOYBEAN COMBINATIONS

|  | PER (absolute) | Range of values | PER (corrected) |
|---|---|---|---|
| Control (Carnation Milk) | 3.28±0.27 | 2.91–3.61 | 3.00 |
| Soybean/fish, 3:1 wt. ratio | 2.41±0.19 | 2.02–2.63 | 2.20 |
| Tempeh/fish, 3:1 wt. ratio | 2.71±0.26 | 2.10–2.86 | 2.48 |

By the "t" test, a statistical significance test, there was a significant difference only between the control and the soybean/fish. It may be noted that there was no overlap of values between the milk and the tempeh/fish. If one uses the ranking test this suggests a definite difference ($p<0.01$) in favor of the milk. Using the same test, the fish/tempeh is superior to the fish/soybean ($p<0.05$).

Additional tests were carried out to determine the oil content and peroxide values of a fermented tempeh-fish admixture prepared in accordance with this invention and the values of these tests are compared with the values obtained from an unfermented soybean fish admixture. These test results are set forth in accompanying Table II:

TABLE II.—OIL CONTENT AND PEROXIDE VALUE OF THE PRODUCTS

|  | Oil content | Peroxide value |
|---|---|---|
| Fermented tempeh/mackerel, 3:1 wt. ratio | 31.2 | 0.6 |
| Unfermented soybean/mackerel, 3:1 wt. ratio | 32.9 | 16.6 |

These determinations were done eight months after the fermentation, while the samples had been kept at room temperature in an atmosphere of air. At this time the tempeh/mackerel sample had a pleasant ester-like smell, whereas the soybean/mackerel sample smelled very strongly of rancid fish oil.

Further tests were directed to the amino acid content and composition of fermented tempeh-fish meal admixtures in accordance with this invention and unfermented soybean-fish meal mixture. These results are set forth in Table III.

TABLE III.—AMINO ACID COMPOSITION OF TEMPEH/MACKEREL 3:1 AND SOYBEAN/MACKEREL 3:1, RESPECTIVELY

|  | Tempeh/mackerel, 3:1 wt. ratio | | Soybean/mackerel, 3:1 wt. ratio | |
|---|---|---|---|---|
|  | μg./mg. dry wt. | Percent amino acids, total amino acids | μg./mg. dry wt. | Percent amino acids, total amino acids |
| Amino acids: |  |  |  |  |
| Lysine | 30 | 7.3 | 29 | 6.4 |
| Histidine | 12 | 2.9 | 13 | 2.9 |
| Arginine | 21 | 5.1 | 30 | 6.6 |
| Aspartic acid | 46 | 11.1 | 53 | 11.7 |
| Threonine | 19 | 4.6 | 20 | 4.4 |
| Serine | 21 | 5.1 | 25 | 5.5 |
| Glutamic acid | 66 | 16.0 | 78 | 17.2 |
| Proline | 20 | 4.9 | 23 | 5.1 |
| Glycine | 20 | 4.9 | 22 | 4.9 |
| Alanine | 24 | 5.8 | 22 | 4.9 |
| Half cystine | 4 | 1.0 | 3 | 0.7 |
| Valine | 20 | 4.9 | 7 | 1.5 |
| Methionine | 7 | 1.7 | 5 | 1.1 |
| Isoleucine | 19 | 4.6 | 19 | 4.2 |
| Leucine | 32 | 7.7 | 35 | 7.7 |
| Tyrosine | 14 | 3.4 | 15 | 3.3 |
| Phenylalanine | 26 | 6.3 | 23 | 5.1 |
| Tryptophan | 11 | 2.7 | 31 | 6.8 |

As indicated hereinabove, by fermenting an admixture of fatty fish pieces, such as sterile fish pieces derived from a fatty fish, e.g. mackerel, together with tempeh, there is produced an edible fish product characterized by the presence of remarkably stable lipids. The fish products thus obtained are stable and exhibit outstanding resistance to oxidative spoilage on storage. In contrast, mixtures of fatty fish pieces and unfermented soybean provided a product which was not stable. In the preparation of tempeh and in the preparation of the edible fermented tempeh-containing food products in accordance with this invention the organism *Rhizopus oligosporus* provides satisfactory results.

Tempeh-containing food products produced in accordance with this invention may contain substantially any fatty protein food material, such as fatty meat, e.g. pork, and fatty fish pieces. Examples of fish which are suitably employed in the preparation of the food products in accordance with this invention include anchovy and sardine which, because of their size, need not be eviscerated or cleaned, mackerel and particularly all the so-called fatty fishes, especially menhaden. Other fish which are usefully employed in the practice of this invention include hake and codfish. Shellfish, including lobster and shrimp, are also useful in the preparation of food products in accordance with this invention.

In the embodiments of the practice of this invention wherein soybean is fermented to produce tempeh or wherein the fermentation of tempeh is carried forward in the presence of fish, the fermentation operation, desirably employing *Rhizopus oligosporus* as the fermenting organism, is carried out at a suitable elevated temperature, such as a temperature in the range from about 85° F. to about 115° F., more or less, e.g. in the range 95–100° F., depending upon the speed of which it is desired that the fermentation take place. Desirably, during the fermenation operation the mixture undergoing fermentation is exposed to a relatively high humidity, upwards of 50% relative humidity. Usually, for increased productivity, the tempeh fermentation is carried out at an elevated temperature, about 100° F. and for the shortest period of time, usually in the range 5–40 hours, more or less, depending upon the taste and/or stability desired in the final product and the degree of prefermentation of the soybean or tempeh before it is admixed with the meat and/or fish pieces for fermentation therewith.

In the practice of this invention tempeh, because of its known and valuable food properties, is an important component. The amount of tempeh in the food product may range from a minor amount, from about 20% by weight, to a major amount, upwards to about 80–90% by weight. The amount of tempeh present in the food composition may vary depending upon the taste or desire of the manufacturer and/or consumer and/or the availability of soybean (tempeh) and the meat or fish protein (fish pieces).

It is preferred in the practice of this invention to employ tempeh in the preparation of the fermentable fish or meat protein tempeh-containing admixture since, as already mentioned herein, tempeh contains an antioxidant which effectively protects the other food components in the fermentable admixture against undesirable taste and degradation due to oxidation.

As will be apparent to those skilled in the art in the light of the foregoing disclosure, many modifications, alterations and substitutions are possible in the practice of this invention without departing from the spirit or scope thereof.

I claim:

1. A method of producing an edible food product which comprises preparing a fermentable admixture comprising tempeh and sterilized fatty meat pieces or fish pieces or fish meal acidified to a pH in the range 4–6, fermenting the resulting admixture at a temperature in the range 85–115° F. for 5–40 hours at a relative humidity greater than about 50% and sterilizing the resulting fermented admixture, said sterilized fermented admixture containing 20–90% by weight tempeh.

2. A method in accordance with claim 1 wherein said fish pieces are derived from a fatty fish.

3. A method in accordance with claim 1 wherein lactic acid is included in the fermentable admixture.

4. A method in accordance with claim 3 wherein the fermented admixture is freeze-dried before sterilization.

5. A method in accordance with claim 1 wherein the fermented admixture is freeze-dried before sterilization.

6. A method in accordance with claim 1 wherein said fish pieces are derived from raw fresh fish which has been cleaned and eviscerated.

7. A method in accordance with claim 1 wherein said fish pieces are raw fresh fish.

8. A method in accordance with claim 1 wherein said fermentable admixture contains substantially equal amounts by weight of fish and tempeh.

9. A method of producing an edible food product which comprises preparing a fermentable admixture comprising dehulled cooked soybeans and sterilized fatty meat pieces or fish pieces or fish meal, said fermentable admixture being acidified to a pH in the range 4–6, introducing into the resulting fermentable admixture a tempeh-producing microorganism, fermenting the resulting admixture at a temperature in the range 85–115° F. for 5–40 hours at a relative humidity greater than about 50% to convert the soybeans therein to tempeh and sterilizing the resulting fermented admixture, said sterilized fermented admixture containing 20–90% by weight tempeh.

10. A method of producing an edible fish product which comprises preparing a fermentable admixture made up of fermented soybeans or tempeh containing the organism *Rhizopus oligosporus*, lactic acid and sterile fish pieces or fish meal, the admixture being acidified to a pH in the range 4–6, fermenting the resulting admixture at a temperature in the range 85–115° F. for 5–40 hours at a relative humidity greater than about 50% and sterilizing the resulting fermented admixture, said sterilized fermented admixture containing 20–90% by weight fermented soybeans or tempeh.

11. A method of producing an edible fish product which comprises preparing a fermentable admixture comprising sterile fish pieces, lactic acid and soybeans together with the tempeh-producing organism *Rhizopus oligosporus*, said fermentable admixture having a pH in the range 4–6, fermenting the resulting admixture at a temperature in the range 85–115° F. for 5–40 hours at a relative humidity greater than about 50% and sterilizing fermented admixture, said sterilized fermented admixture containing 20–90% by weight tempeh.

12. A method of preparing an edible food product which comprises converting boiled dehulled soybeans to tempeh, admixing fresh deboned fish pieces with said tempeh to form a fermentable admixture, said admixture having been acidified to a pH in the range 4–6, fermenting the resulting admixture at a temperature in the range 85–115° F. for 5–40 hours at a relative humidity greater than about 50%, said fermented admixture containing 20–90% by weight tempeh.

13. A method in accordance with claim 12 wherein said fermented admixture is sterilized.

14. A method in accordance with claim 12 wherein said fermented admixture is freeze-dried and sterilized.

15. A method in accordance with claim 12 wherein the soybean is converted to tempeh by inoculating the soybean with the fungus *Rhizopus oligosporus*.

16. An edible food product produced in accordance with claim 1.

References Cited

UNITED STATES PATENTS 3,185,574    5/1965    Gabby et al.

A. LOUIS MONACELL, Primary Examiner

R. M. ELLIOTT, Assistant Examiner

U.S. Cl. X.R.

99—14, 18, 111